United States Patent [19]

Baumgartner et al.

[11] Patent Number: 5,515,949
[45] Date of Patent: May 14, 1996

[54] PNEUMATICALLY OPERATED DISK BRAKE

[75] Inventors: Hans Baumgartner, Moosburg; Dieter Bieker, Munich; Johann Iraschko, Schweitenkirchen, all of Germany

[73] Assignee: Knorr Bremse AG, Munich, Germany

[21] Appl. No.: 236,121

[22] Filed: May 2, 1994

[30] Foreign Application Priority Data

May 4, 1993 [DE] Germany .......................... 43 14 720.8

[51] Int. Cl.⁶ .................................................. F16D 65/16
[52] U.S. Cl. ..................... 188/72.9; 188/355; 188/106 F; 384/908
[58] Field of Search .................................. 188/71.7, 71.8, 188/72.1, 72.6, 106 F, 196 A, 196 V, 355, 356; 384/191.2, 206, 213, 908, 909; 403/130, 132, 135, 140

[56] References Cited

U.S. PATENT DOCUMENTS 4,790,682  12/1988  Henkel ...................... 403/140

FOREIGN PATENT DOCUMENTS

| 0523439A1 | 1/1993  | European Pat. Off. . |
| 3301167   | 7/1984  | Germany . |
| 3716202   | 11/1988 | Germany . |
| 3940679   | 6/1991  | Germany . |
| 4032885   | 4/1992  | Germany . |
| 4212384   | 10/1993 | Germany . |
| 4212405   | 10/1993 | Germany .......................... 188/196 V |

Primary Examiner—Robert J. Oberleitner
Assistant Examiner—Chris Schwartz
Attorney, Agent, or Firm—Barnes & Thornburg

[57] ABSTRACT

A pneumatically operated disk brake wherein a ball socket bearing at the connection of a lever arm to a compressed air cylinder's plunger arm of a caliper includes a slide bearing between the ball and the socket of the ball socket bearing whose sliding surface, consists of at least 70% by volume polyvinylidenefluoride, at least 10% by volume polytetrafluoro ethylene and a remainder of lead.

18 Claims, 1 Drawing Sheet

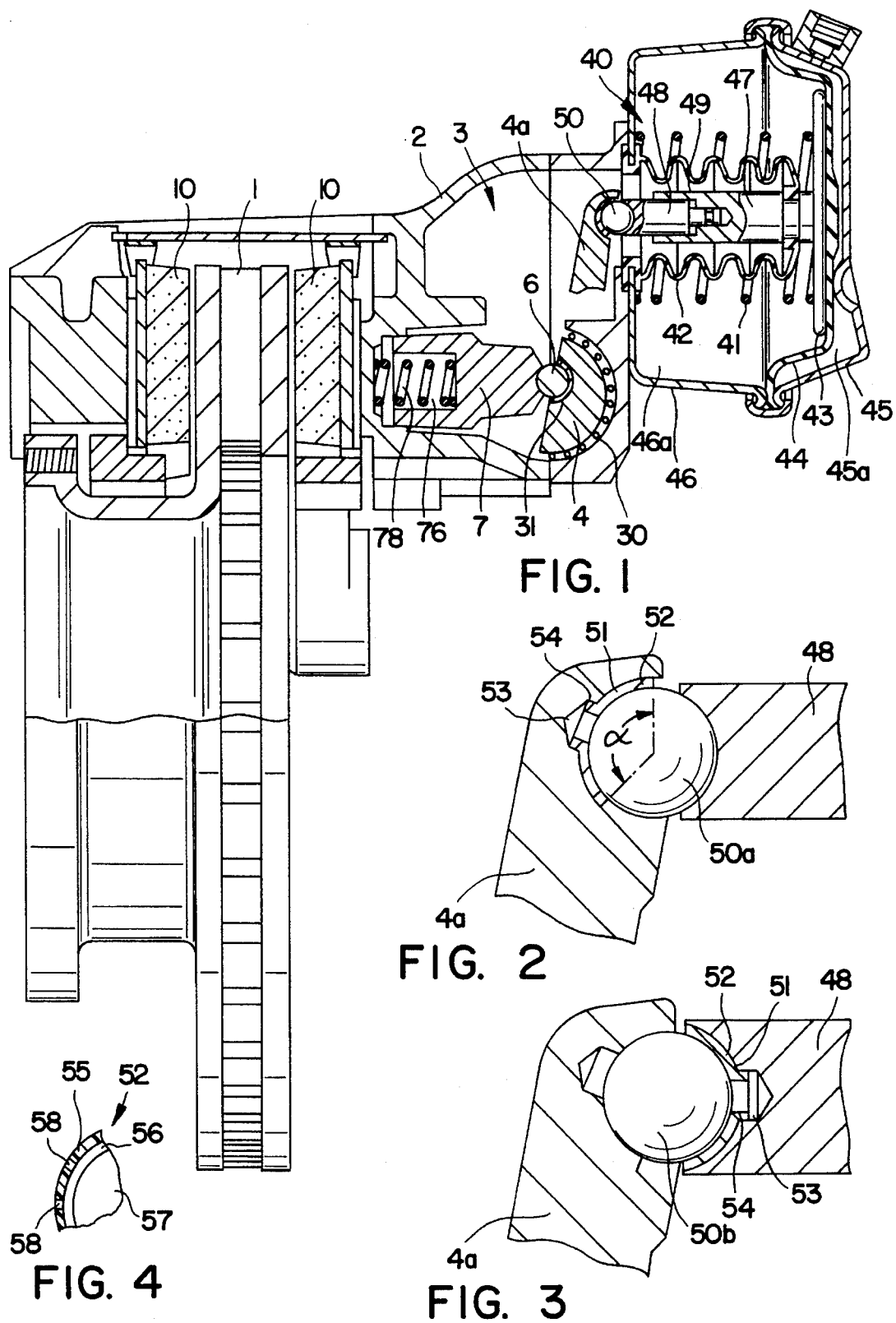

PNEUMATICALLY OPERATED DISK BRAKE

BACKGROUND AND SUMMARY OF THE INVENTION

The present invention relates to a pneumatically operated disk brake which is provided particularly for commercial road vehicles.

Pneumatically operated or pneumatic disk brakes of the above-mentioned type are known, for example, from German Patent Document DE-OS 37 16 202, German Patent Document DE-OS 40 32 885 as well as German Patent Document DE-OS 42 12 384 which is not a prior publication. In the case of these known disk brakes, a caliper, which can be displaced in the axial direction, reaches around a brake disk. A pneumatically operated brake application device is arranged on one side of the caliper and during the actuating of this brake application device, a brake shoe, which is situated on this side of the brake disk, is pressed against the corresponding friction surface of the brake disk. The caliper is displaced in the opposite direction because of the reaction forces and, as a result, a brake shoe situated on the opposite side, also presses against the brake disk.

In the case of these known disk brakes, the brake application device has a rotary lever as a control element which is disposed to swivel about a swivel axis which extends parallel to the plane of the brake disk. In this case, the rotary lever, on its side facing the brake disk, rests, by means of an eccentric connection, approximately in the longitudinal center on a traverse member which extends parallel to the swivel axis. The traverse member is guided to be displaceable with respect to the brake disk. At least one adjusting spindle provided with an external thread is adjustably screwed in a respectively assigned internal thread of the traverse member. According to the number of adjusting spindles, this type of a brake application device is indicated to be either a "single-spindle type" or a "double-spindle type".

For operating the rotary lever, a compressed-air cylinder, when acted upon by compressed air, displaces an outlet-side plunger rod by a certain distance. Since the end of the plunger rod engages, by a ball socket bearing, in an articulated manner with the end of the lever arm of the rotary lever, the rotary lever is swivelled by a corresponding extent. The rotary lever, by means of the eccentric, as explained above, displaces the traverse member in the direction of the brake disk. In the known brake application devices, the above-mentioned ball socket bearing is formed by a socket in the shape of a dome-shaped recess constructed on the end of the lever arm of the rotary lever. The recess receives the end of the plunger rod which is shaped as a hemisphere.

With a view to an efficiency of the brake application device that should be as high as possible as well as, in particular, and also taking into account the optimization of its hysteresis characteristics, the known brake application devices provide a grease lubrication on the contact surface between the socket and the hemisphere during the operation. This achieves the desired operating characteristics by the corresponding reduction of the surface friction and, at the same time, also reduce wear. Tests on the initially mentioned brake application devices have shown, for example, that by reducing the coefficients of friction of the lever mechanism, a clear improvement of the hysteresis action of the brake can be achieved. Furthermore, it was already taken into consideration to harden the end of the plunger rod which is shaped as a hemisphere in order to further reduce wear.

However, in practice, the grease lubrication presents problems because a lubrication for the length of the service life can hardly be implemented in the case of the normal operating conditions. Relubrication, which becomes necessary from time to time, requires a demounting of the brake application device which, however, results in high shop costs. The mentioned hardening of the end of the plunger rod also considerably increases the manufacturing costs of the compressed-air cylinder. For this reason, this measure is also considered to be disadvantageous.

In order to avoid the above-mentioned disadvantages of the conventional ball socket bearing between the plunger rod and the rotary lever, it may in principle be considered to provide a slide bearing. However, experiments made by the applicant using such bearings have not yet had any satisfactory results. In particular, it has so far not been possible to find a bearing which has such low coefficients of friction that the achievable hysteresis is satisfactory. The use of a slide bearing has also been rejected because the bearing stress occurring in the case of the preferred geometry of the lever arrangement has exceeded the maximal loading capacity of the tested slide bearings so that a sufficiently high service life could not be achieved.

The invention is based on the object of further developing a pneumatically operated disk brake in such a manner that the manufacturing and maintenance costs of the brake application device can be clearly reduced while the brake hysteresis remains good.

According to the invention, a slide bearing is arranged between the ball and the socket of the ball socket bearing, wherein the sliding surface of the slide bearing consists of at least 70% by volume polyvinylidenefluoride (PVDF), at least 10% by volume polytetrafluoro ethylene (PTFE), and a remainder of lead. Experiments have surprisingly shown that a slide bearing having the mentioned composition, in the case of the dynamic loads occurring during the operation of the lever mechanism and of the ball socket bearing, will not fail and will always have a sufficient, extremely long service life even under extremely high load values. Furthermore, the above-mentioned slide bearing has the characteristic that, in the highly stressed condition, its coefficient of friction is reduced significantly. The coefficients of friction achieved, according to the invention, reach or even exceed those of a roller bearing, and the coefficients of friction of the conventional grease lubrication are exceeded in every case.

Since a slide bearing of this type is comparatively inexpensive, the manufacturing costs of the brake application device, according to the invention, are not significantly affected. Furthermore, because of the low coefficient of friction of the slide bearing according to the invention, an extremely favorable efficiency of the lever mechanism is achieved so that the disk brake equipped with it has a very good hysteresis behavior.

Particularly advantageous characteristics of the bearing according to the invention were achieved when this bearing is lubricated. This type of a slide bearing should preferably have lubrication bore reliefs to further reduce the coefficients of friction and maintain it constant for a long time. In addition, even in the case of the slide bearing in the lubricated condition, a regular or multiple lubrication will not be necessary so that to this extent a lubrication for life is provided which therefore does not cause any additional shop costs.

When dimensioning the bearing surfaces, it should be endeavored according to the further development of the invention that the sliding surface of the slide bearing has such a dimension that the bearing stress occurring when the ball socket bearing is acted upon by maximum stress, amounts to at least 200 N/mm², and preferably up to 300 N/mm². Even after extreme long-time tests, these load values have resulted in no bearing failure and, because of the above-mentioned characteristic of the bearing that the coefficient of friction improves at an increased pressure, permit the adjustment of an optimal course of the hysteresis. During the dimensioning of the bearing, it should also be endeavored that the angle of wrap of the sliding bearing amounts to less than 120 degrees. This securely prevents any jamming of the ball socket bearing and thus of the brake application device.

An advantageous fastening of the slide bearing in the socket may be achieved, for example, by a cylindrical passage in the slide bearing which points toward the socket and which engages in a correspondingly shaped blind hole of the socket. Preferably, the cylindrical passage and the blind hole of the socket are dimensioned such that a press fit can be achieved. As a further advantage, the cylindrical passage is constructed in the center of the slide bearing.

In the case of the ball socket bearing according to the invention, the socket may be constructed either on the lever arm of the rotary lever or on the end of the plunger rod of the compressed-air cylinder. An essential aspect of the invention is in both cases, the ball of the ball socket bearing, in contrast to the state of the art, does not consist of a hardened hemisphere projection but of a roller bearing ball which is inserted or welded into a corresponding hemispherical recess of the plunger rod or of the lever arm. A roller bearing ball of this type is available as a standard component and, despite the high degree of hardness, is significantly less expensive than the implementation of a corresponding hardening process in the case of the hemisphere projection of the plunger rod in the case of the known application devices. Furthermore, a roller bearing ball of this type has almost ideal surface characteristics and an excellent roundness so that the bearing characteristics are improved further with respect to the efficiency and the hysteresis. The roller bearing ball according to the invention can be fastened in the hemispherical recess particularly advantageously by friction welding.

Other objects, advantages and novel features of the present invention will become apparent from the following detailed description of the invention when considered in conjunction with the accompanying drawings.

BRIEF DESCRIPTION OF THE DRAWINGS

FIG. 1 is a partial cross-sectional view of the schematic construction of the brake application device;

FIG. 2 is a view of an enlarged detail Of FIG. 1 for explaining a first embodiment of the ball socket bearing according to the invention; and FIG. 3 is a view of an enlarged detail of FIG. 1 for explaining a second embodiment of the ball socket bearing according to the invention.

FIG. 4 is a cross-sectional view of a sliding bearing according to the invention.

DESCRIPTION OF THE PREFERRED EMBODIMENTS

As illustrated in FIG. 1, an internally ventilated brake disk 1, which is fastened to an axle of a commercial vehicle which is not shown in detail, is surrounded by a caliper 2. The caliper 2 is mounted on the vehicle by a rigid guide bearing (not shown) as well as a compensating bearing (also not shown), so that it is axially displaceable with respect to the brake disk 1. Otherwise, the construction and the function of the caliper are known so that they do not have to be explained in detail.

On the side of the brake disk 1 which is on the right in FIG. 1, is a brake application device 3. An essentially semicircular rotary bearing 30 is provided in the caliper 2, which crosses the axis of the brake disk at a right angle and extends parallel to the plane of the brake disk 1 add receives the correspondingly rounded back area of a rotary lever 4. The rotary lever 4 can therefore be swivelled about a swivel axis which extends parallel to the plane of the brake disk 1. For operating the rotary lever 4, a brake cylinder 40 is provided which has a known construction and which has a two-part plunger rod 47, 48 which, by means of a ball socket bearing or joint, which will be explained in detail below, is in an articulated engagement with a lever arm (operating arm) 4a of the rotary lever 4.

The brake cylinder 40 essentially comprises a housing formed by two housing shells 45 and 46 which is divided in an airtight manner into two chambers by a flexible membrane 44. The chamber facing away from the disk brake 1 or "outer" chamber 45a communicates with a compressed-air supply line. On the side of the membrane 44 facing the "inner" chamber 46a, a pressure plate 43 is fastened on first plunger rod 47 of the two plunger rods as well as a restoring spring are fastened. The other plunger rod 48 is coaxially fastened in the plunger rod 47. By dividing the plunger rod into two parts, it is possible—possibly by using additional spacers—to precisely adjust the length of the plunger rod with respect to the rotary lever 4. Finally, the inner chamber 46a also has bellows 42 so that any penetration of dirt into the interior of the brake application device can be securely prevented.

When the brake cylinder 40 or its outer chamber 45a is acted upon by compressed air, the plunger rod 47, 48 is moved out of its inoperative position in the direction of the disk brake so that the lever arm 4a of the rotary lever 4 is swivelled from its inoperative position indicated in FIG. 1 toward the left in the direction of the brake disk 1. It should be noted that the rotary lever 4 may be operated by a longer brake linkage whose end corresponds to the illustrated plunger rod. Thus, the brake cylinder 40, if necessary, may also be placed in a different location if the available installation space for the disk brake or its application device is limited.

The side of the rotary lever 4 which faces away from the half-shell-shaped pivot bearing 30 is coupled by an eccentrically mounted cam 6 with a traverse member 7 which extends inside the caliper 2 essentially parallel to the axis of rotation of the brake disk 1 and can be moved in this plane. At its end facing the brake disk 1, the traverse member 7 has a blind-hole-type recess 76 in a projection which is surrounded by a tube-type projection which juts out in the direction of the brake disk 1. This projection of the traverse member 7 is slidably disposed in a corresponding recess of the caliper 2 at a right angle to the plane of the brake disk 1. Play is maintained between traverse member 7 and caliber 2 so that the traverse member 7 can swivel slightly in the plane of the drawing. A flat spiral spring 78 inside the recess 76 is clamped between the traverse member 7 and the end of the caliper 2 facing the brake disk 1 and thereby prestresses the traverse member 7 in the direction of the rotary lever 4.

On both sides, the traverse member 7 has a bore which is provided with an internal thread and into which a respective adjusting spindle (not shown) is adjustably screwed. At the end of each of the adjusting spindles which faces the brake disk 1, a conically widening thrust piece is fastened which rests against a brake shoe 10. Particularly in the circumferential direction with respect to the brake disk 1, the brake shoe 10 is guided by holding devices which are not shown so that it can be displaced transversely to the brake disk 1. Thus, the holding devices may be assigned either to the caliper 2 or to a brake anchor plate. Compensation for the abrasion of the brake shoe 10, an adjusting device is arranged in the interior of one of the two adjusting spindles, this adjusting device being rotated by a specified angular amount during each operation of the rotary lever 4, whereby a continuous adjusting of the brake is ensured. Although in the case of the described embodiment of the traverse member 7, two adjusting spindles and therefore two thrust pieces are provided. The invention may also be used for a traverse member which has only one adjusting spindle and therefore only one thrust piece.

The following is a brief explanation of the operating principle of the brake application device. When the brake cylinder 40 is acted upon by compressed air in chamber 45a, the lever arm 4a according to FIG. 1 is swivelled toward the left, whereby the eccentric 6 acting on the rotary lever 4 is also displaced toward the left by a distance which is reduced according to the lever principles. The traverse member 7 is therefore pressed against the prestressing force of the spiral spring 78 by a corresponding distance in the direction of the brake disk 1. The thrust pieces fastened to the traverse member 7 therefore, while overcoming the ventilating play between brake disk 1 and brake shoe 10, press the brake shoe 10 against the brake disk 1. When the operating arm 4a is swivelled farther to the left, the caliper 2 is displaced toward the right in FIG. 1 because of the force exercised on the brake disk 1 so that finally the left brake shoe 10 is also pressed against the brake disk 1. When, the brake shoes 10 have been displaced by a predetermined distance corresponding to a desired ventilating play, the adjusting device is operated by further leftward movement of the rotary lever 4. If the ventilating play was adjusted correctly, the two brake shoes 10 will rest against the brake disk 1 at this point in time. Consequently, a friction clutch in the adjusting device will respond. When, in contrast, a ventilating play exists which is too large, which may occur, for example, after changing the lining or in the case of an increasing wear of the brake shoes, the adjusting spindles will rotate a certain distance and thereby bring the ventilating play to the desired value, possibly after a repeated actuating of the brake.

Furthermore, with respect to additional details and more detailed operational sequences of the brake and adjustment, reference is made to the initially mentioned documents of the applicant, to the disclosure of which reference is made here as far as their full content is concerned.

In the following, the construction of the ball socket bearing according to the invention will be explained in detail with reference to FIGS. 2 and 3.

In the embodiment of the ball socket bearing illustrated in FIG. 2, a hemispherical or dome-shaped recess 51 is constructed at the end of the lever arm 4a of the rotary lever 4, for example, by milling. This recess if formed by the socket of the ball socket bearing. According to the invention, a slide bearing 52 is disposed in this socket whose sliding surface, is preferably dimensioned such that the nominal loading capacity, produced by the compressed air in the brake cylinder 40, maximally amounts to between 200 and 300 N/mm². The required dimensioning of the slide bearing 52 may be achieved, for example, by the suitable selection of the diameter of the socket 51. The loading of the bearing may naturally also be increased by the reduction of the surface of the slide bearing 52, in which case it should be endeavored not to make the angle of wrap larger than 120 degrees in order to securely prevent any jamming.

According to the invention as illustrated in FIG. 4, the slide bearing 52 is a bearing which is formed of a sliding layer 55, a bronze layer 56, and a steel back serving as the base 57. The sliding layer contains at least 70, preferably 80% by volume, polyvinylidenefluoride (PVDF), at least 10% by volume polytetrafluoro ethylene (PTFE) and a remainder of lead and has a thickness of approximately from 0.05 to 0.1 mm. The intermediate bronze layer consists preferably of a porous material preferably consisting of 9 to 12% tin, maximally 12% lead and a remainder of copper. In the sliding surface of the bearing 52, lubrication bore reliefs 58, shown in FIG. 4, are also constructed according to a preferred embodiment.

In the method of operation of the slide bearing 52 according to the invention, in which this slide bearing is operated in a relatively high load condition, the coefficient of friction is reduced by a considerable factor with respect to the corresponding value when the load of the bearing is low. As a result, the efficiency of the lever mechanism of the brake application device is clearly improved which has a favorable effect on the hysteresis behavior during braking.

Detailed long-time studies have confirmed that the slide bearing constructed according to the teaching of the invention, in contrast to all other studied bearings, has a service life which meets the requirements in practice in every case. Another advantage of this slide bearing is the fact that the bearing will also not be damaged when, during a full admission of compressed air to the brake cylinder (maximal actuating of the brake pedal), the parking brake is operated at the same time. In other words, the bearing according to the invention can easily withstand twice to three times the nominal pressure.

In addition, it was found to be advantageous to lubricate the slide bearing 52 during the mounting of the brake application device by a suitable lubricant. In this connection, long-time studies have confirmed that this lubrication is sufficient for the total service life of the brake application device so that no additional lubricants must be supplied during servicing operations. This significantly improves the ease of servicing.

The embodiment of the ball socket bearing illustrated in FIG. 3 differs from the embodiment of FIG. 2 in that the socket is constructed on the end of the plunger rod 48. On the front end of the plunger rod 48, a hemispherical or dome-shaped recess 51 is constructed, for example, by milling. Also in this recess or socket, a slide bearing 52 is disposed, according to the invention, which has the above-explained construction and is dimensioned to be suitable for operating under maximum loading.

As illustrated clearly in the representation of FIGS. 2 and 3, a cylindrical passage or extension 54 is constructed in the slide bearing 52 which points in the direction of the socket 51 and which engages in a correspondingly shaped blind hole 53 of the socket 51. In this case, the cylindrical passage 54 and the blind hole 53 of the socket 51 are dimensioned such that a press fit is achieved. Thus, the slide bearing 52 can be mounted and possibly demounted in a simple manner. The cylindrical passage 54 is constructed approximately in the center of the slide bearing 52.

A further aspect of the invention is the fact that the ball 50 of the ball socket bearing preferably consists of a roller bearing ball which is fitted or welded into a corresponding hemispherical recess 55a (FIG. 2) or 55b (FIG. 3) of the plunger rod 48 or of the lever arm 4a. A roller bearing ball of this type is available as a standard component and is therefore, despite the high degree of hardness, much less expensive than the implementation of a corresponding hardening process of an otherwise required hemisphere projection of the plunger rod 48 or of the lever arm 4a. Furthermore, a roller bearing ball 50 of this type has almost ideal surface characteristics or an excellent roundness. In addition, the roller bearing ball 50 is preferably fastened in the hemispherical recess by means of friction welding; clamp fit may possibly also be taken into consideration.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A pneumatically operated disk brake having a brake disk and a caliper with a brake shoe positioned relative to the brake disk by an application device, the application device includes a swivellably disposed rotary lever connected at one end by a ball socket bearing to a plunger rod of a compressed-air cylinder and at a second end by an eccentric connection to a traverse member which can be displaced with respect to the brake disk, the ball socket bearing comprises:

a ball, a socket and slide bearing there between;

a sliding surface, of said slide bearing, consists of at least 70% by volume polyvinylidenefluoride, at least 10% by volume polytetrafluoro ethylene, and a remainder of lead; and lubrication bore reliefs in the sliding surface of the slide bearing.

2. A disk brake according to claim 1, wherein the socket is on the rotary lever.

3. a disk brake according to claim 2, wherein the ball of the ball socket bearing includes a roller bearing ball fastened to a corresponding hemispherical recess of the plunger rod.

4. A disk brake according to claim 3, wherein the roller bearing ball is fastened in the hemispherical recess by friction welding.

5. A disk brake according to claim 1, wherein the ball of the ball socket bearing includes a roller bearing ball fastened in a corresponding hemispherical recess of the lever arm.

6. A disk brake according to claim 5, wherein the roller bearing ball is fastened in the hemispherical recess by friction welding.

7. A disk brake according to claim 1, including a cylindrical extension on the slide bearing which points toward the socket and which engages in a correspondingly shaped blind hole of the socket.

8. A disk brake according to claim 7, wherein the cylindrical extension is in the center of the slide bearing.

9. A disk brake according to claim 1, wherein the sliding surface of the slide bearing consists of approximately 80% by volume polyvinylidenefluoride, approximately 10% by volume polytetrafluoro ethylene and approximately 10% by volume lead.

10. A disk brake according to claim 1, wherein the sliding surface of the slide bearing has a thickness of between 0.05 and 0.1 mm.

11. A disk brake according to claim 1, wherein an angle of wrap of the slide bearing is less than 120 degrees.

12. A disk brake according to claim 1, wherein the slide surface of the slide bearing is lubricated.

13. A disk brake according to claim 1, wherein said sliding surface of the slide bearing is dimensioned to withstand a bearing stress, which occurs in the case of a maximal pressure admission to the compressed air cylinder, of at least 200 N/mm$^2$.

14. A disk brake according to claim 1 wherein the socket is on the end of the plunger rod of the compressed-air cylinder.

15. A pneumatically operated disk brake having a brake disk and a caliper with a brake shoe positioned relative to the brake disk by an application device, the application device includes a swivellably disposed rotary lever connected at one end by a ball socket bearing to a plunger rod of a compressed-air cylinder and a second end by an eccentric connection to a traverse member which can be displaced with respect to the brake disk, the ball socket bearing comprises:

a ball, a socket and slide bearing there between;

a sliding surface, of said slide bearing, consists of at least 70% by volume polyvinylidenefluoride, at least 10% by volume polytetrafluoro ethylene, and a remainder of lead; and a porous intermediate layer made of bronze is arranged between a sliding surface layer of the slide bearing and a support base layer.

16. A disk brake according to claim 15 wherein said bronze consists of 9 to 12% tin, maximally 12% lead and a remainder of copper.

17. A disk brake according to claim 15, wherein the support base layer of the slide bearing is made of steel.

18. A disk brake according to claim 15, wherein sliding surface of the slide bearing is dimensioned to withstand a bearing stress, which occurs in the case of a maximal pressure admission to the compressed air cylinder, of up to 300 N/mm$^2$.

* * * * *